United States Patent
Kirmse et al.

(10) Patent No.: US 11,860,713 B2
(45) Date of Patent: Jan. 2, 2024

(54) SECURE OPERATIONS OF CLOUD LANDSCAPES THROUGH WORKFLOW TEMPLATES

(71) Applicant: SAP SE, Walldorf (DE)

(72) Inventors: Daniel Kirmse, Berlin (DE); Henning Zahn, Muehlenbeck (DE)

(73) Assignee: SAP SE, Walldorf (DE)

( * ) Notice: Subject to any disclaimer, the term of this patent is extended or adjusted under 35 U.S.C. 154(b) by 144 days.

(21) Appl. No.: 17/510,671

(22) Filed: Oct. 26, 2021

(65) Prior Publication Data

US 2023/0132141 A1    Apr. 27, 2023

(51) Int. Cl.
*G06F 11/07* (2006.01)
*G06F 9/455* (2018.01)

(52) U.S. Cl.
CPC ...... *G06F 11/0712* (2013.01); *G06F 9/45558* (2013.01); *G06F 11/0781* (2013.01); *G06F 11/0793* (2013.01); *G06F 2009/45562* (2013.01); *G06F 2009/45587* (2013.01)

(58) Field of Classification Search
CPC ............. G06F 11/0712; G06F 11/0781; G06F 11/0793; G06F 9/45558; G06F 2009/45562; G06F 2009/45587
See application file for complete search history.

(56) References Cited

U.S. PATENT DOCUMENTS

| | | | |
|---|---|---|---|
| 2021/0279160 A1* | 9/2021 | Huang | G06F 3/0483 |
| 2023/0068096 A1* | 3/2023 | Patti | G06F 9/4881 |

* cited by examiner

*Primary Examiner* — Matthew M Kim
*Assistant Examiner* — Kyle Emanuele
(74) *Attorney, Agent, or Firm* — SCHWEGMAN LUNDBERG & WOESSNER, P.A.

(57) ABSTRACT

In an example embodiment, a workflow engine is introduced within a cloud landscape. Runbooks re then implemented as workflow templates within the workflow engine. The workflow engine allows for creation of workflows from the workflow templates as well as composing workflows from individual steps. The workflow engine provides a mechanism to describe workflow templates and workflow sets as code.

20 Claims, 6 Drawing Sheets

SECURE OPERATIONS OF CLOUD LANDSCAPES THROUGH WORKFLOW TEMPLATES

BACKGROUND

When computer services offer cloud offerings, there are typically cloud landscapes hosting a large number of customer application instances to leverage scaling and resource sharing a much as possible. An issue with a landscape immediately affects a large number of customers.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
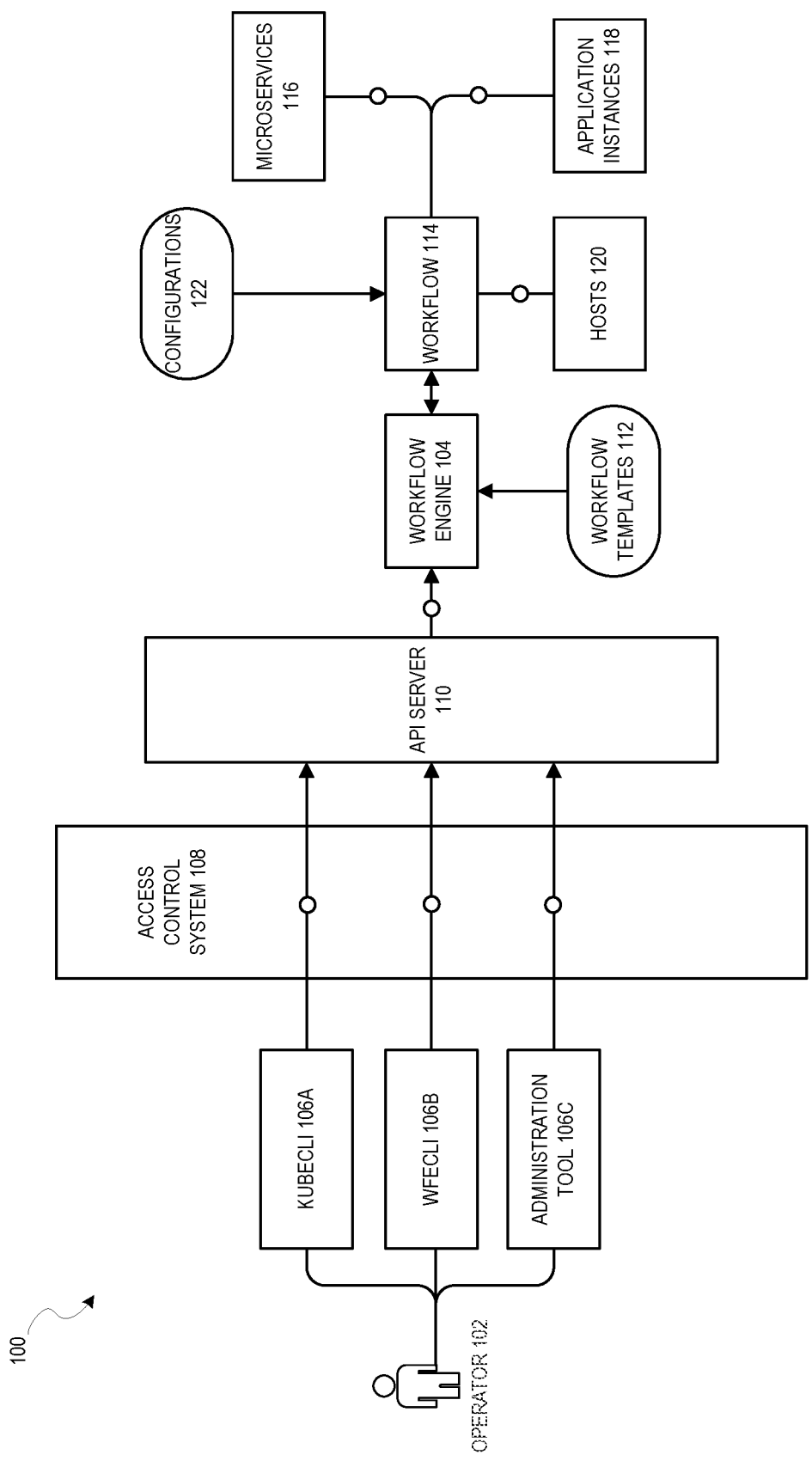
FIG. 1 is a block diagram illustrating a system providing a secure operations architecture in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In a cloud landscape, application instances are isolated against each other so that customers and their data stay well separated from other customers. When accessing a landscape in a manner that modifies base functionality, it becomes easy to dispute all running application instances with a single interaction. As such, cloud landscapes are typically locked down with access to base functionality only granted in rare cases, which are extremely well designed and protected by processes that are subject to audits. For example, an operations employee or on-call duty developer may be granted access to analyze issues that arise in cloud landscapes and find a way to resolve the issues quickly. This can involve working under very high pressure and outside of working hours, increasing the chances for human error.

The most prominent case to grant low-level access occurs during incident handling. There are alerts that signal some severe issue with the cloud landscape or customer tickets indicating severe issues with the landscape. These issues must be addressed using techniques such as operating system access, or Kubernetes cluster access, which require access to the low-level cloud landscape operations and introduces the possibility of catastrophic error.

One technique to reduce the chance of human error in these situations is to utilize a runbook, which is a compilation of routine procedures and operators that a system administrator or operator can carry out. It is essentially a "how to" guide for resolving an issue. Nevertheless, even with the use of runbooks, human error is inevitable, as operations employees or on-call duty developers still need to follow the runbook, replace placeholders in the runbook with accurate current values, follow the chains of decisions based on findings, etc.

In addition, the changes applied to solve an issue are recorded for audit purposes, but the operations engineers still need to receive high-privileged access profiles so that they can drive root cause analysis without disruption and restore operability as quickly as possible. However, even with the audit systems in place, this still may not mesh well with the security requirements of some cloud customers, such as those in financial services, defense, or public health, because the operators working on issues from such customers could potentially access very sensitive customer data. Auditing cannot prevent such abuse, it can only document it.

Another risk introduced by runbooks is that the procedures may be similar, but not the same, and these deviations may slip the attention of an operator due to habitual behavior, when one of the procedures has to be performed more often. Additionally, some procedures are meant to be the same, but are in actuality slightly different.

In an example embodiment, a workflow engine is introduced within a cloud landscape. Runbooks are then implemented as workflow templates within the workflow engine. The workflow engine allows for creation of workflows from the workflow templates as well as composing workflows from individual steps. The workflow engine provides a mechanism to describe workflow templates and workflow sets as code.

In an example embodiment, the workflow engine comes with a command line tool.

FIG. 1 is a block diagram illustrating a system 100 providing a secure operations architecture in accordance with an example embodiment. The system 100 may include an operator 102, who may use one of several different interfaces to access a workflow engine 104. These interfaces include a Kubernetes command line interface (kubecli) 106A, a workflow engine command line interface (wfecli) 106B, and an administration tool 106C. The wfecli 106B is a command line interface designed to work specifically with the workflow engine 104, while the kubecli 106A and the administration tool 106C may operate with other services, such as the kubecli working with a Kubernetes Application Program Interface server.

In an example embodiment, the operator 102 uses one of the interfaces 106A, 106B, 106C to access the workflow engine 104 via an access control system 108 and an API server 110. The access control system 108 verifies that the operator 102 is permitted to access the workflow engine, such as by verifying credentials such as a user name and password, or a certificate (or both). The API server provides APIs to translate the commands from the interfaces 106A, 106B, 106C into commands readable by the workflow engine 104.

These commands may include creating or modifying one or more workflow templates 112, or instantiating one of the workflow templates 112 into a workflow 114. Instantiating involves creating an executable file within a virtual machine, such as a Kubernetes virtual machine, and executing the executable file. The executable file/virtual machine may be assigned privileges that allow it to access low level cloud landscape operations, such as access/modifications to microservices 116, application instances 118, and/or hosts 120.

Instantiation also allows the workflow 114 to be populated with parameters, which may be obtained from one or more configurations 122, or retrieved via access with microservices 116, application instances 118, and/or hosts 120.

Configurations are files containing user-defined parameters that can be used by the workflow when the workflow is executed. Examples include display and graphical interface preferences, and communication preferences.

To maximize security, each workflow may come with its own service account, so that only the specified roles and privileges needed to perform an appropriate task are granted to the workflow. Notably, there is a distinction between the roles and privileges assigned to an operator, which in an example embodiment will no longer include the privilege to access low-level cloud application operations. Rather, these roles and privileges will be assigned to the workflow engine itself, and the operator will, at best, only be assigned a role and/or privilege that allows the operator to instantiate the workflows from the workflow templates, and to influence execution by passing in workflow-specific parameters.

Through the assigned roles and privileges, the workflow engine 104 is able to access any entities in the cloud landscape and read information from these entities. The workflow engine 104 is also able to modify the cloud landscape entities as well.

The centerpiece for the secure operations concept is implementing the runbooks as code. Rather than writing down instructions that have to be followed and executed by humans to analyze and resolve an alert, runbooks are implemented as workflow templates. A service in the cloud landscape defines alerts that are used to signal issues with the service that need immediate attention to avoid disruptions to the services offered to customers. Alert definitions as well as workflow templates may be part of the service's deliverable. An example of such a service bundle (application deployment description, alert definition, and workflow template) is a Kubernetes helm chart. Helm is a package manager for Kubernetes. It provides for the ability to create Helm charts, which are bundles with one or more Kubernetes manifests. The service deployment bundle as a whole is subject to a secure and certified software development & release process, which ensures that only reviewed, tested and released artefacts are finally reaching production landscapes which increases security and reduces operational risks to a bare minimum.

Each alert definition may be accompanied by a workflow template implementing a mitigation of the situation the alert is signaling. This workflow template replaces the text-style runbooks. All relevant artifacts are kept in synchronization with each other. Whenever a new version of the service is shipped, the alert definitions and the runbook workflow templates are in sync with each other. Whenever a deliverable gets deployed to a cloud landscape, it updates the service as well as the alerts and runbook workflow templates in one step.

In an example embodiment, services also may provide workflow steps to be reused by other services in workflow templates. This is especially helpful for services that use other services to fulfill a task. By using the workflow steps provided by the consumed service in their own workflows, it is guaranteed that any relevant changes to the consumed service are also applied to the workflow steps.

The workflow steps may be part of the public API of a service, and are visible to all, but executable by nobody as that remains the exclusive domain of the workflow engine 104.

As described briefly above, in order to reduce attack surface, workflows come with their own service account. The service account only gets assigned the privileges needed to perform its task(s). An accumulation of critical privileges may be avoided using this technique.

Any access to the API server 110 is protected by the access control system 108, which provides the mechanism to request and approve access, as well as the ability to audit requests and approvals. It also limits the low-level cloud landscape access to the workflow engine 104 itself, so that the person access was granted to can only instantiate workflows but no longer has modifying access to the cloud landscape beyond that.

Thus, all high privileged access is encapsulated by the workflow template. The involved operator never gets the chance to execute any of those critical operations directly. Thus, the system moves from "we can provide that somebody accessed your sensitive data if that happens" to "nobody ever accesses your sensitive data."

As such, the present solution provides the means to resolve incidents without needing operators to be granted low-level access to cloud landscapes, thus reducing the risks imposed by human behavior. It also provides a means to keep incident resolution tactics up to date, by turning them into code that can be tested along with code changes applied to the services the incident resolution is meant form. Prior art runbooks need to be executed regularly by a large group of operators to ensure that all operators are prepared for the worst, and even with this regular execution failures still occur. Workflows, on the other hand, need no such training, as they work consistently due to being deterministic in nature and executed/tested with any change going to the service landscape.

By using standardized workflow steps, audit records can also be harmonized as well as certain recurring procedures, thus reducing the effort needed to develop a runbook. A developer is able to focus on the steps that are unique to his or her particular incident resolution tactic, while using the overall steps from a workflow template that applies to other incident types.

Standardized workflow templates also reduce the effort of change in case a code change to services breaks the procedure used in them.

In an example embodiment, the API server 110 is a Kubernetes API server and the workflow engine 104 is implemented as a custom resource of Kubernetes. Custom resources are defined by a custom resource definition (CRD) and managed by a controller. A CRD is a set of parameters used by Kubernetes in managing the lifecycle of Kubernetes objects, such as pods. In an example embodiment, stateful applications managed by Kubernetes custom resources are utilized with the behavior toggles. That is, the lifecycle of the stateful application is managed by a custom resource and its controller. This concept is known as a Kubernetes operator.

Any custom resources created in a Kubernetes cluster specify the key to the resource definition it fulfils (API version and kind). If the key is known in the cluster, the resource will be checked against the resource definition. If it compiles, then it gets created and the controller of that resource type will reconcile the resource (e.g., read its content and perform the work to create a state in the cluster that was described by that resource). A controller gets registered in the cluster as being able to reconcile a specific resource type identified by API version and kind.

Figure 2:
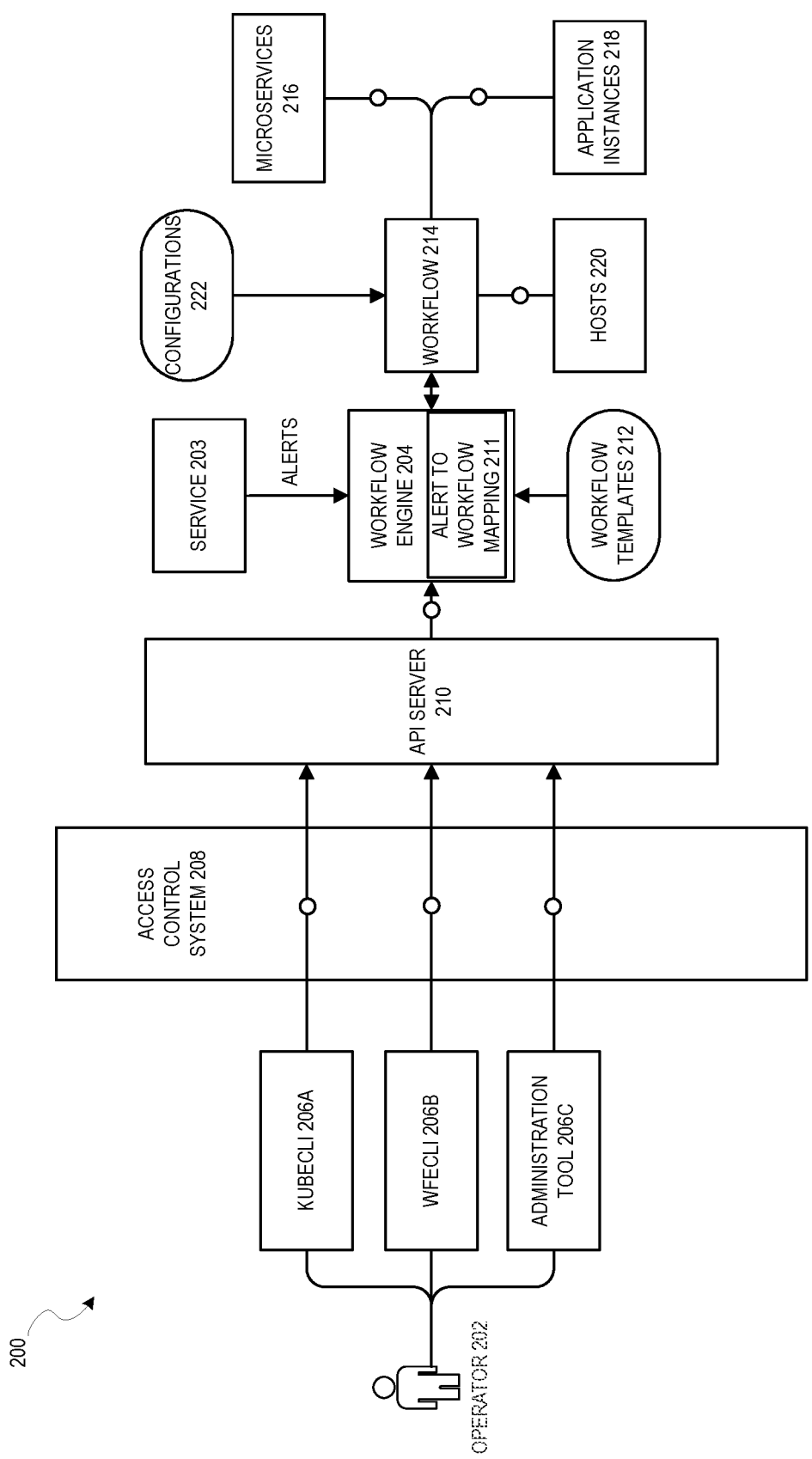
FIG. 2 is a diagram is a block diagram illustrating a system providing a secure operations architecture in accordance with an example embodiment.

FIG. 1 depicts an implementation where a human operator is involved in triggering the instantiation of the one or more workflow templates 112, after receiving notification of an alert from a service in a cloud landscape that the service is having an issue. In another example embodiment, the human operator may be eliminated (or at least reduced in importance) by using artificial intelligence to handle alerts from a service. FIG. 2 is a diagram is a block diagram illustrating a system 200 providing a secure operations architecture in accordance with an example embodiment. Here, no human operator 202 is needed. Rather, alerts from a service 203 are passed directly to the workflow engine 204. Notably, because no interface is needed between the workflow engine 204 and a human operator, it becomes possible to eliminate the interfaces 206A-206C, access control system 208, and API server 210. In actuality, however, these elements may be maintained in the system 200 in for different purposes than workflow template editing and workflow instantiation, or are used only for workflow template editing but not workflow instantiation.

Workflow engine 204 maintains an alert to workflow mapping 211. When an alert is received from a service 203, the workflow engine 204 refers to this workflow mapping 211 to identify the workflow to instantiate. The corresponding workflow 214 is then instantiated, removing the operator from this process. In other respects, the process works similarly to that as described with response to FIG. 1, using microservices 216, application instances 218, hosts 220, and configurations 222.

In another example embodiment, service 203 may implement a machine learned model that predicts problems with the service before they occur and generates alerts based on the predicted problems (i.e., proactively). This is in contrast with conventional techniques in which alerts are only generated once a problem is detected (i.e., reactively).

The machine-learned model may be trained by the machine learning algorithm using training data, to make predictions about issues that are likely to arise in the running of a service. The training data may be extracted from a database and obtained directly from a plurality of services. The training data may include features of the services and the operating environments of the services, as well as examples of past issues that have arisen and various metrics of the services and/or operating environments that were present when the issues arose. These examples of past issues may be used as labels for the training data when feeding it to the machine learning algorithm. Relevant information may be extracted from the training data in the form of features. A feature is a piece of data that is relevant to the prediction. These features may be extracted from multiple different sets of reference data The machine learning algorithm may be selected from among many different potential supervised or unsupervised machine learning algorithms. Examples of supervised learning algorithms include artificial neural networks, random forest learner trees, Bayesian networks, instance-based learning, support vector machines, linear classifiers, quadratic classifiers, k-nearest neighbor, decision trees, and hidden Markov models. Examples of unsupervised learning algorithms include expectation-maximization algorithms, vector quantization, and information bottleneck method. The training process includes the machine learning algorithm learning weights to assign to features of services and operating environments. They may be learned by the machine learning algorithm trying different weights, then examining the results of a loss function applied to a score produced by applying the weights to a particular piece of training data. A similar training process may be performed for industry and region. If the loss function is not satisfied, the machine learning algorithm adjusts the weights and tries again. This is repeated in a number of iterations until the loss function is satisfied, and the weights are learned.

Furthermore, the machine-learned model may be retrained at a later time, using actual feedback from users and/or additional training data. The feedback may include, for example, indications that the predicted issues did not actually occur.

Regardless, the output of the machine-learned model is a predicted issue that may occur with a service based on the service and the operating environment and their respective parameters. The machine-learned model can be applied to many different services and operating environments, based on the breadth of the training data used to train it. Inside the machine-learned model, this may be implemented using a classifier, which takes scores calculated by the machine-learned model (which were calculated by multiplying values for input features for an input service/operating environment. Predicted issue(s) whose prediction score exceed a predetermined threshold may then be output as the prediction(s).

Figure 3:
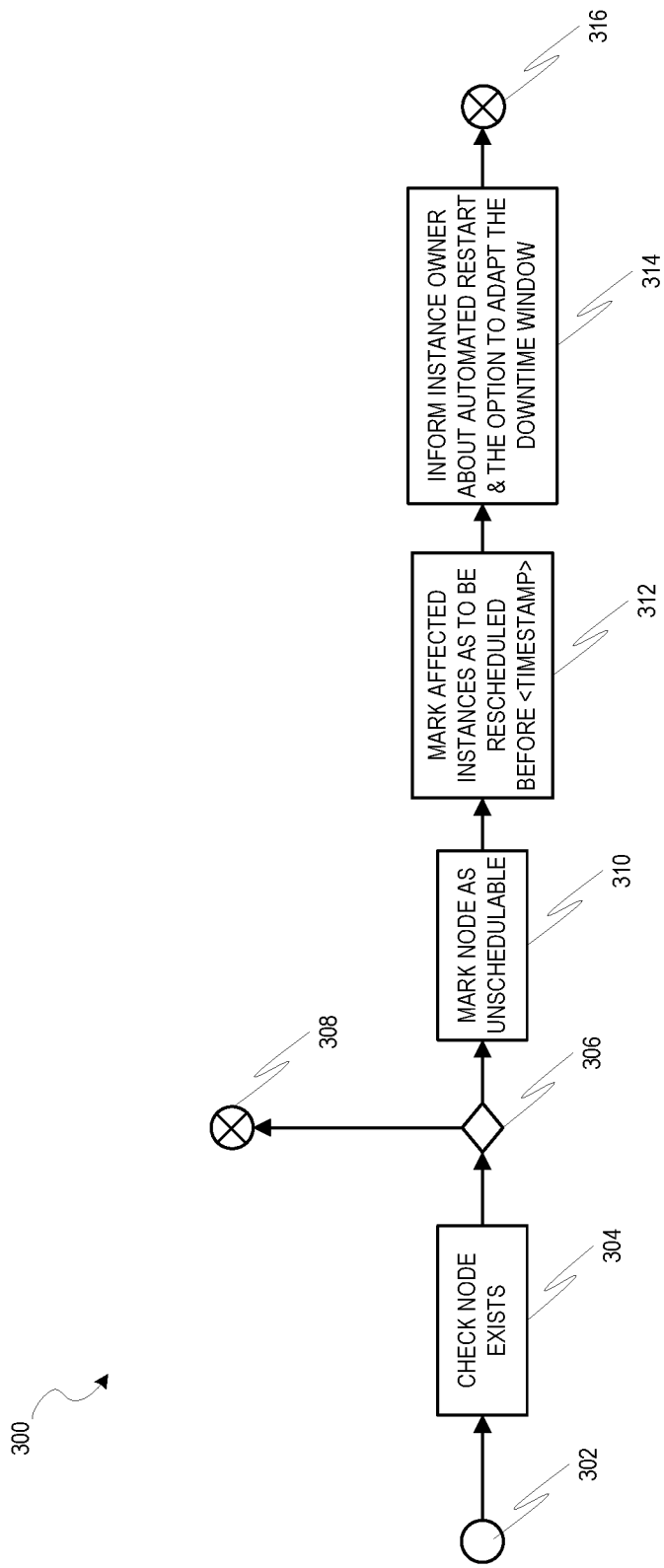
FIG. 3 is a diagram illustrating a runbook, in accordance with an example embodiment.

FIG. 3 is a diagram illustrating a runbook 300, in accordance with an example embodiment. The runbook 300 is presented in the form of a process flow, which may be the way an operator inputs the runbook 300 (using a graphical user interface) and this runbook 300 may then be converted into a YAML file.

In an example embodiment, both the workflow templates and the workflows may be implemented as YAML descriptions. YAML is a digestible data serialization language often used to create configuration files and works in concurrence with any programming language. It is a strict superset of JavaScript Object Notation (JSON), and thus it can do everything that JSON can do, and more.

Here, the workflow begins at reference numeral 302, and at reference numeral 304 an operation that checks whether a node exists is executed. A decision block 306 leads the process to end at reference numeral 308 if the node does not exist, and proceeds to reference numeral 310 if it does, at which point the node is marked as unschedulable. At reference numeral 312, affected instances are marked as "to the rescheduled before <timestamp>", with the timestamp being a parameter. At reference numeral 314, the instance owner is informed of an automated restart and the option to adapt the downtime window. At reference numeral 316, the process ends.

Figure 4:
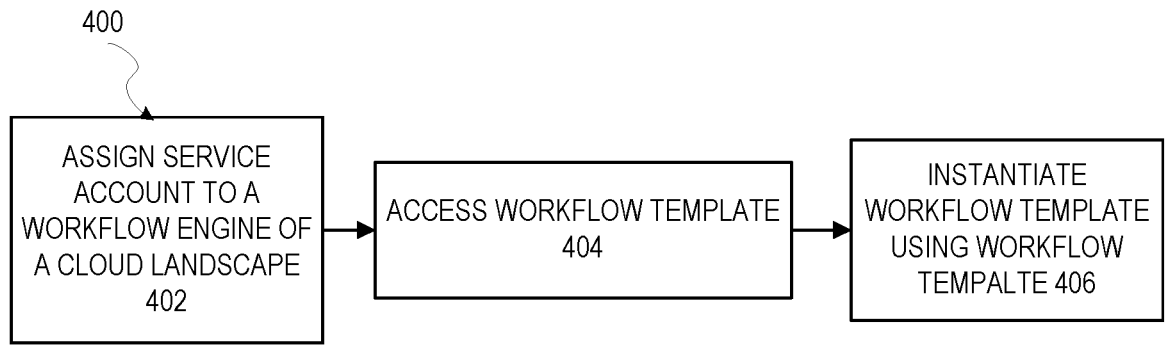
FIG. 4 is a flow diagram illustrating a method for providing a secure operations architecture in accordance with an example embodiment.

FIG. 4 is a flow diagram illustrating a method 400 for providing a secure operations architecture in accordance with an example embodiment. At operation 402, a service account is assigned to a workflow engine of a cloud landscape. The cloud landscape includes one or more components on which low-level operations may be performed. The low-level operations include one or more operations that can cause failure of a service provided by the cloud landscape. The service account includes credentials allowing the workflow engine to execute the low-level operations. The assigning a service account may be performed using an access control system, the access control system further acting to block human operators from running the low-level operations and from obtaining parameters from the one or more components in the cloud landscape.

At operation 404, a workflow template is accessed. The workflow template defines a process for performing low-level operations on a component of the cloud landscape in order to address an issue that has been identified with running of the service. The process includes populating one or more parameter fields in the process. At operation 406, a workflow is instantiated using the workflow template. The instantiating includes creating a virtual machine to run the workflow, running the low-level operations defined in the workflow template in the virtual machine, and populating the one or more parameter fields using parameters obtained from one or more components in the cloud landscape, the running and populating performed using the credentials included in the service account.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a non-transitory computer-readable medium storing instructions that, when executed by the at least one hardware processor, cause the at least one hardware processor to perform operations comprising:
assigning a service account to a workflow engine of a cloud landscape, the cloud landscape including one or more components on which a plurality of low-level operations may be performed, the low-level operations including one or more operations that can cause failure of a service provided by the cloud landscape, the service account including credentials allowing the workflow engine to execute the low-level operations;
accessing a workflow template, the workflow template defining a process for performing one or more of the plurality of low-level operations on a first component of the one or more components of the cloud landscape in order to address an issue that has been identified with running of the service; and
instantiating a workflow using the workflow template, the instantiating including creating a virtual machine to run the workflow, running the low-level operations defined in the workflow template in the virtual machine, and populating the one or more parameter fields based on the defined process using parameters obtained from one or more components in the cloud landscape, the running and populating performed using the credentials included in the service account.

Example 2. The system of Example 1, wherein the assigning a service account is performed using an access control system, the access control system further acting to block human operators from running the low-level operations and from obtaining parameters from the one or more components in the cloud landscape.

Example 3. The system of Examples 1 or 2, wherein the accessing and instantiating are triggered via a request from a human operator, via a software input program in communication with an application program interface (API) server located inside the cloud landscape.

Example 4. The system of Example 3, wherein the software input program is a command line interface (CLI).

Example 5. The system of Example 3, wherein the API server is a Kubernetes API server.

Example 6. The system of Example 5, wherein the workflow engine is implemented as a custom resource of Kubernetes.

Example 7. The system of any of Examples 1-6, wherein the accessing and instantiating are triggered by the workflow engine receiving an alert from a service, the workflow engine further identifying the workflow template to access using a mapping between alerts and workflow templates.

Example 8. The system of Example 7, wherein the alert is generated by a machine learned model monitoring the service, the machine learned model trained using training data about services and operating environments and outputting a prediction of an issue that will arise with the running of the service but that has not arisen yet.

Example 9. A method comprising:
assigning a service account to a workflow engine of a cloud landscape, the cloud landscape including one or more components on which a plurality of low-level operations may be performed, the low-level operations including one or more operations that can cause failure of a service provided by the cloud landscape, the service account including credentials allowing the workflow engine to execute the low-level operations;
accessing a workflow template, the workflow template defining a process for performing one or more of the plurality of low-level operations on a first component of the one or more components of the cloud landscape in order to address an issue that has been identified with running of the service; and
instantiating a workflow using the workflow template, the instantiating including creating a virtual machine to run the workflow, running the low-level operations defined in the workflow template in the virtual machine, and populating the one or more parameter fields based on the defined process using parameters obtained from one or more components in the cloud landscape, the running and populating performed using the credentials included in the service account.

Example 10. The method of Example 9, wherein the assigning a service account is performed using an access control system, the access control system further acting to block human operators from running the low-level operations and from obtaining parameters from the one or more components in the cloud landscape.

Example 11. The method of Examples 9 or 10, wherein the accessing and instantiating are triggered via a request from a human operator, via a software input program in communication with an application program interface (API) server located inside the cloud landscape.

Example 12. The method of Example 11, wherein the software input program is a command line interface (CLI).

Example 13. The method of Example 11, wherein the API server is a Kubernetes API server.

Example 14. The method of Example 13, wherein the workflow engine is implemented as a custom resource of Kubernetes.

Example 15. The method of any of Examples 9-14, wherein the accessing and instantiating are triggered by the workflow engine receiving an alert from a service, the workflow engine further identifying the workflow template to access using a mapping between alerts and workflow templates.

Example 16. The method of Example 15, wherein the alert is generated by a machine learned model monitoring the service, the machine learned model trained using training data about services and operating environments and outputting a prediction of an issue that will arise with the running of the service but that has not arisen yet.

Example 17. A non-transitory machine-readable medium storing instructions which, when executed by one or more processors, cause the one or more processors to perform operations comprising:

assigning a service account to a workflow engine of a cloud landscape, the cloud landscape including one or more components on which a plurality of low-level operations may be performed, the low-level operations including one or more operations that can cause failure of a service provided by the cloud landscape, the service account including credentials allowing the workflow engine to execute the low-level operations;

accessing a workflow template, the workflow template defining a process for performing one or more of the plurality of low-level operations on a first component of the one or more components of the cloud landscape in order to address an issue that has been identified with running of the service; and instantiating a workflow using the workflow template, the instantiating including creating a virtual machine to run the workflow, running the low-level operations defined in the workflow template in the virtual machine, and populating the one or more parameter fields based on the defined process using parameters obtained from one or more components in the cloud landscape, the running and populating performed using the credentials included in the service account.

Example 18. The non-transitory machine-readable medium storing instructions of Example 17, wherein the assigning a service account is performed using an access control system, the access control system further acting to block human operators from running the low-level operations and from obtaining parameters from the one or more components in the cloud landscape.

Example 19. The non-transitory machine-readable medium storing instructions of Examples 17 or 18, wherein the accessing and instantiating are triggered via a request from a human operator, via a software input program in communication with an application program interface (API) server located inside the cloud landscape.

Example 20. The non-transitory machine-readable medium storing instructions of Example 19, wherein the software input program is a command line interface (CLI).

Figure 5:
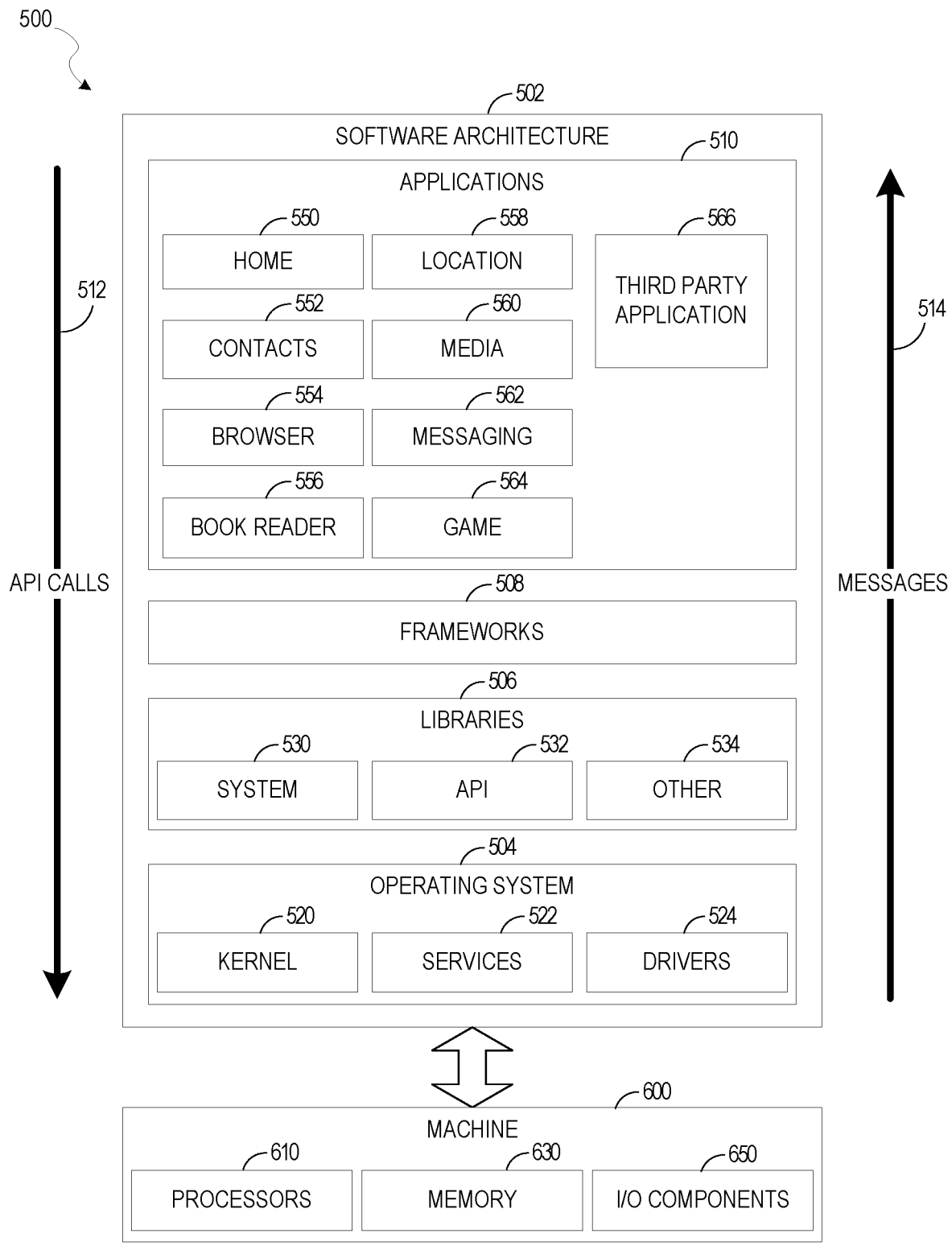
FIG. 5 is a block diagram illustrating a software architecture, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke Application Program Interface (API) calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. The applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 566 can invoke the API calls 512 provided by the operating system 504 to facilitate functionality described herein.

Figure 6:
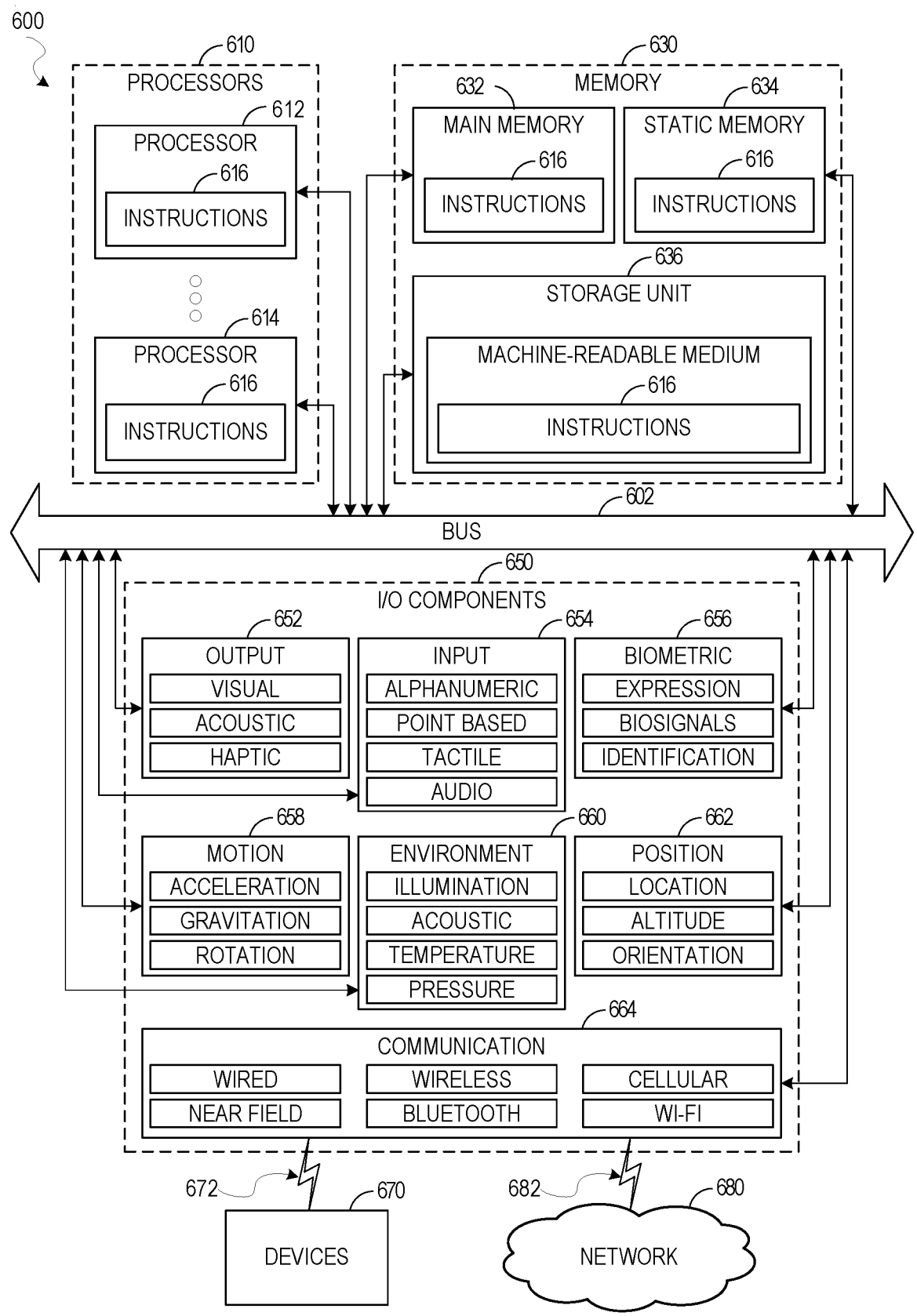
FIG. 6 illustrates a diagrammatic representation of a machine in the form of a computer system within which a set of instructions may be executed for causing the machine to perform any one or more of the methodologies discussed herein.

FIG. 6 illustrates a diagrammatic representation of a machine 600 in the form of a computer system within which a set of instructions may be executed for causing the machine 600 to perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a non-transitory computer-readable medium storing instructions that, when executed by the at least one hardware processor, cause the at least one hardware processor to perform operations comprising:
    assigning a service account to a workflow engine of a cloud landscape, the cloud landscape including one or more components on which a plurality of low-level operations may be performed, the low-level operations including one or more operations that can cause failure of a service provided by the cloud landscape, the service account including credentials allowing the workflow engine to execute the low-level operations;

accessing a workflow template, the workflow template defining a process for performing one or more of the plurality of low-level operations on a first component of the one or more components of the cloud landscape in order to address an issue that has been identified with running of the service; and instantiating a workflow using the workflow template, the instantiating including creating a virtual machine to run the workflow, running the low-level operations defined in the workflow template in the virtual machine, and populating one or more parameter fields based on the defined process using parameters obtained from one or more components in the cloud landscape, the running and populating performed using the credentials included in the service account.

2. The system of claim 1, wherein the assigning a service account is performed using an access control system, the access control system further acting to block human operators from running the low-level operations and from obtaining parameters from the one or more components in the cloud landscape.

3. The system of claim 1, wherein the accessing and instantiating are triggered via a request from a human operator, via a software input program in communication with an application program interface (API) server located inside the cloud landscape.

4. The system of claim 3, wherein the software input program is a command line interface (CLI).

5. The system of claim 3, wherein the API server is a Kubernetes API server.

6. The system of claim 5, wherein the workflow engine is implemented as a custom resource of Kubernetes.

7. The system of claim 1, wherein the accessing and instantiating are triggered by the workflow engine receiving an alert from the service, the workflow engine further identifying the workflow template to access using a mapping between alerts and workflow templates.

8. The system of claim 7, wherein the alert is generated by a machine learned model monitoring the service, the machine learned model trained using training data about services and operating environments and outputting a prediction of an issue that will arise with the running of the service but that has not arisen yet.

9. A method comprising:
assigning a service account to a workflow engine of a cloud landscape, the cloud landscape including one or more components on which a plurality of low-level operations may be performed, the low-level operations including one or more operations that can cause failure of a service provided by the cloud landscape, the service account including credentials allowing the workflow engine to execute the low-level operations;

accessing a workflow template, the workflow template defining a process for performing one or more of the plurality of low-level operations on a first component of the one or more components of the cloud landscape in order to address an issue that has been identified with running of the service; and instantiating a workflow using the workflow template, the instantiating including creating a virtual machine to run the workflow, running the low-level operations defined in the workflow template in the virtual machine, and populating one or more parameter fields based on the defined process using parameters obtained from one or more components in the cloud landscape, the running and populating performed using the credentials included in the service account.

10. The method of claim 9, wherein the assigning a service account is performed using an access control system, the access control system further acting to block human operators from running the low-level operations and from obtaining parameters from the one or more components in the cloud landscape.

11. The method of claim 9, wherein the accessing and instantiating are triggered via a request from a human operator, via a software input program in communication with an application program interface (API) server located inside the cloud landscape.

12. The method of claim 11, wherein the software input program is a command line interface (CLI).

13. The method of claim 11, wherein the API server is a Kubernetes API server.

14. The method of claim 13, wherein the workflow engine is implemented as a custom resource of Kubernetes.

15. The method of claim 9, wherein the accessing and instantiating are triggered by the workflow engine receiving an alert from the service, the workflow engine further identifying the workflow template to access using a mapping between alerts and workflow templates.

16. The method of claim 15, wherein the alert is generated by a machine learned model monitoring the service, the machine learned model trained using training data about services and operating environments and outputting a prediction of an issue that will arise with the running of the service but that has not arisen yet.

17. A non-transitory machine-readable medium storing instructions which, when executed by one or more processors, cause the one or more processors to perform operations comprising:
assigning a service account to a workflow engine of a cloud landscape, the cloud landscape including one or more components on which a plurality of low-level operations may be performed, the low-level operations including one or more operations that can cause failure of a service provided by the cloud landscape, the service account including credentials allowing the workflow engine to execute the low-level operations;

accessing a workflow template, the workflow template defining a process for performing one or more of the plurality of low-level operations on a first component of the one or more components of the cloud landscape in order to address an issue that has been identified with running of the service; and instantiating a workflow using the workflow template, the instantiating including creating a virtual machine to run the workflow, running the low-level operations defined in the workflow template in the virtual machine, and populating one or more parameter fields based on the defined process using parameters obtained from one or more components in the cloud landscape, the running and populating performed using the credentials included in the service account.

18. The non-transitory machine-readable medium storing instructions of claim 17, wherein the assigning a service account is performed using an access control system, the access control system further acting to block human operators from running the low-level operations and from obtaining parameters from the one or more components in the cloud landscape.

19. The non-transitory machine-readable medium storing instructions of claim 17, wherein the accessing and instantiating are triggered via a request from a human operator, via a software input program in communication with an application program interface (API) server located inside the cloud landscape.

20. The non-transitory machine-readable medium storing instructions of claim 19, wherein the software input program is a command line interface (CLI).

\* \* \* \* \*